J. B. BURDETT.
WELDING TORCH CONSTRUCTION.
APPLICATION FILED DEC. 24, 1910.
1,002,134.
Patented Aug. 29, 1911.
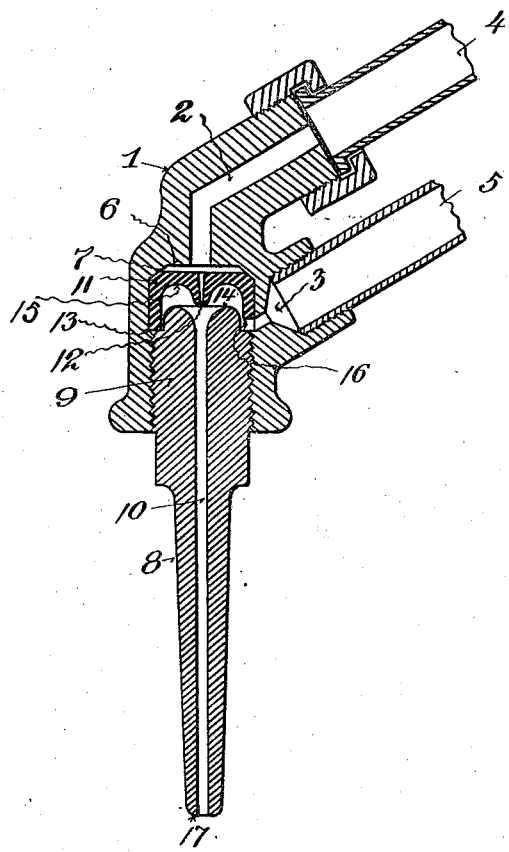

UNITED STATES PATENT OFFICE.

JOHN B. BURDETT, OF CHICAGO, ILLINOIS, ASSIGNOR TO NATIONAL PNEUMATIC COMPANY, OF CHICAGO, ILLINOIS, A CORPORATION OF DELAWARE.

WELDING-TORCH CONSTRUCTION.

1,002,134.

Specification of Letters Patent. Patented Aug. 29, 1911.

Application filed December 24, 1910. Serial No. 599,189.

*To all whom it may concern:*

Be it known that I, JOHN B. BURDETT, a citizen of the United States, residing at Chicago, county of Cook, State of Illinois, have made a certain new and useful Invention in Welding-Torch Constructions, of which the following is a specification.

The invention relates to welding or cutting torches, and particularly to torches of the class employing a mixture of oxygen and acetylene to produce the welding or cutting flame.

The object of the invention is to provide a torch construction which is simple, efficient and economical to manufacture.

A further object is to provide a torch tip construction capable of being readily removed and replaced according to the character of the work to be done.

A further object of the invention is to provide a torch tip structure which secures an efficient mixing of the component gases employed to produce the welding or cutting flame, and wherein the acetylene gas is delivered to the mixing chamber of the torch tip by a suction or aspirating action produced by the delivery of the oxygen under higher pressure.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

The single view of the drawing shows in longitudinal section a welding torch tip structure embodying the principles of my invention.

In the drawing 1 designates the torch head or cap having an interiorly threaded chamber and passages 2, 3, delivering to said chamber, the passage 2 communicating through pipe connection 4, with a source of oxygen supply, and the passage 3 communicating through a pipe or other connection 5 with a source of acetylene gas supply. The oxygen supply passage 2 delivers into the chamber of the head or cap centrally through the base wall 6, thereof, said base wall having a bearing seat surface 7, surrounding the delivery opening of said passage 2. The tip 8 is provided with an exteriorly threaded shank portion 9, adapted to be screwed into the interiorly threaded portion of cap 1, and also with a centrally arranged longitudinally extending bore or channel 10, of uniform area throughout its length and constituting what I shall term the mixing channel. Interposed between the inner end surface of the shank portion 9 of the tip and the base wall of the chamber in head 1, is a cap piece 11 having a bearing surface coöperating with the bearing surface 7 to form a tight seat thereagainst. Centrally through the base of the cap 11 is a bore or duct 12 of reduced area with reference to passage 2, but registering with said passage, and forming a communication therefrom which delivers directly above the inner end of the mixing channel 10, the mixing channel 10 being in alinement with the bore 12. On the surface of its inner end the shank portion 9 is formed with a shoulder 13 encircling a flange 14 formed on said end surface to surround the entrance to the channel 10. The flange of cap 11 bears against the shoulder 13 when the tip 8 is screwed into the head 1, whereby the cap 11 is held and pressed firmly against its seat in the base of the chamber of the head. The interior surface 15 of the cap which is juxtaposed with reference to the flange 14 is concaved, while the exterior surface of the flange 14 is convexed. Communication is effected between the acetylene gas supply passage 3 and the interior of the cap 11 through an opening 16, the interior diameter of the flange of cap 11 being somewhat greater than the exterior diameter of the flange 14. The end of the bore 12 through the cap, which is presented toward the inner end of the mixing channel 10, may be reduced in area, if desired, to form an aspirating nozzle or injector.

In operation the oxygen under pressure is delivered through the passage 2 and nozzle bore 12 into the mixing channel 10. By reason of the injector or suction action of the flow of oxygen under pressure, the acetylene gas under lower pressure is drawn from the passage 3 through opening 16, into the interior of cap 11, and is carried along with the oxygen into the mixing channel, the mixed gases finally emerging from the extremity 17 of the tip for ignition to produce the welding or cutting flame. By reason of the convexity of the exterior surface of the flange 14, and the concavity of the inner juxtaposed surface of the cap 11, the acetylene gas is given a whirling motion as it is drawn into the mixing channel thereby enabling a more efficient mixture of the gases to be accomplished than otherwise would be possible. The opening 16, it will be seen, through which the acetylene gas is drawn into the interior of the cap, is formed at a point adjacent the base of the flange 14. This gas in circulating through the interior of the cap and around the exterior surface of the flange 14, is, as above indicated, given a whirling motion which materially aids in securing the desired intimate mixture thereof with the oxygen by which it is drawn into the mixing channel.

The torch construction embodying my invention is equally well adapted for welding and for cutting purposes. The controlling difference in the use of the device for the one or the other of these purposes is the difference in oxygen supply or the pressure under which it may be supplied. By merely varying the relative supply or pressure of the oxygen the device may be used for the one or the other purpose.

Having now set forth the object and nature of my invention, what I claim as new and useful, and of my own invention, and desire to secure by Letters Patent, is,—

1. A torch comprising a head having a chamber, and high pressure and low pressure gas supply passages delivering into the chamber, a tip having a longitudinal channel forming a mixing chamber channel, and adapted to be removably secured in the chamber of said head, a cup-shaped cap removably interposed between the end of said tip and the base of the head chamber, and provided with a central bore through the end wall thereof and in line with the mixing chamber channel of the tip, and communicating with the high pressure gas supply passage, said cap having an opening through the side wall thereof communicating with the low pressure gas supply passage.

2. In a welding torch, the combination of a chambered head having high and low pressure gas supply passages and formed with a bearing surface encompassing the high pressure supply passage, a tip to be removably secured in the head chamber and having a longitudinal channel forming a mixing channel and a shouldered inner end surface, and a cap having a bearing surface to seat against the bearing surface formed in the chambered head, and a flange to seat against the shouldered end surface of the tip, said cap having a central bore of reduced area in line with the high pressure gas supply passage and the mixing channel, the flange of said cap having an opening communicating with the low pressure gas supply passage.

3. In a torch, a chambered head having high and low pressure gas supply passages, a tip adapted to be removably secured in the said head chamber, and provided with a longitudinal channel forming a mixing channel, and an end flange surrounding the inner end of said mixing channel, and a cap interposed between the inner end of the tip and the base of the head chamber and surrounding said flange, said cap having a central bore delivering from the high pressure gas supply passage into the mixing channel, the inner surface of the cap being concaved and the outer surface of said flange being convexed, said cap having an opening delivering from the low pressure gas supply passage to the space surrounding the flange.

In testimony whereof I have hereunto set my hand in the presence of the subscribing witnesses, on this 16th day of December, A. D. 1910.

JOHN B. BURDETT.

Witnesses:
HUGH S. ADAMS,
HAROLD ROWNTREE.